United States Patent [19]

Leorat et al.

[11] Patent Number: 4,679,988
[45] Date of Patent: Jul. 14, 1987

[54] TWO-RANGE PRESSURE CONTROL SYSTEM

[75] Inventors: François Leorat, Versailles; Patrick Coutant, Rueil Malmaison; Paul Aubert, Clamart, all of France

[73] Assignee: Regie Nationale des Usines Renault, Boulogne-Billancourt, France

[21] Appl. No.: 777,326

[22] Filed: Sep. 18, 1985

[30] Foreign Application Priority Data

Sep. 18, 1984 [FR] France .................. 84 14261

[51] Int. Cl.$^4$ .................. F04B 47/00; G05D 16/00
[52] U.S. Cl. .................. 417/218; 137/625.64; 137/625.66; 417/222
[58] Field of Search .................. 137/596.15, 596.16, 137/505.14, 625.66, 625.6, 625.64; 60/452; 417/218, 222; 251/30.01, 31, 33, 41

[56] References Cited

U.S. PATENT DOCUMENTS

| | | | |
|---|---|---|---|
| 2,849,889 | 9/1958 | Ball et al. .................. | 137/596.15 X |
| 3,820,920 | 6/1974 | Klimaszewski et al. .......... | 417/218 X |
| 4,072,443 | 2/1978 | Heath .................. | 60/452 X |
| 4,094,211 | 6/1978 | Espenschied .................. | 74/866 X |
| 4,189,921 | 2/1980 | Knapp .................. | 60/452 X |
| 4,279,268 | 7/1981 | Aubert . | |
| 4,302,937 | 12/1981 | Aubert . | |
| 4,426,194 | 1/1984 | Pollman .................. | 417/218 |

FOREIGN PATENT DOCUMENTS

| | | |
|---|---|---|
| 0009749 | 4/1980 | European Pat. Off. . |
| 0009758 | 4/1980 | European Pat. Off. . |
| 2084771 | 12/1971 | France . |
| 2109792 | 5/1972 | France . |
| 2278021 | 2/1976 | France . |
| 2321640 | 3/1977 | France . |
| 2446424 | 8/1980 | France . |

Primary Examiner—Martin P. Schwadron
Assistant Examiner—Stephen M. Hepperle
Attorney, Agent, or Firm—Oblon, Fisher, Spivak, McClelland & Maier

[57] ABSTRACT

Pressure control device comprising a manual valve (VM) associated with a pressure control valve (VRP), includes a first line pressure ($P_L$), defined by two calibrated jets in series, which are placed on a duct set at zero pressure by the manual valve (VM) being in a first position R. At a second line pressure range ($P_L$), a duct is fed at line pressure ($P_L$), the manual valve (VM) is in a second position A. A variation of line pressure ($P_L$) is assured by a modulating solenoid valve (EVM), which establishes a modulated pressure ($P_M$) acting on a differential section ($\Sigma$) of said pressure control valve (VRP).

10 Claims, 4 Drawing Figures

4,679,988

TWO-RANGE PRESSURE CONTROL SYSTEM

BACKGROUND OF THE INVENTION

1. Field of the Invention

This invention relates to a two-range pressure control system having a pressure control device associated with a manual valve.

2. Description of the Related Art

Numerous pressure control devices having several valves, in more or less complex combinations, to obtain several pressure levels are known.

SUMMARY OF THE INVENTION

The object of this invention is to provide a relatively simple system that connects a manual valve with a pressure control device to obtain two pressure ranges, the second pressure range being able to have two possible levels depending on the control mode initially adopted.

According to the invention, the two-range pressure control system is essentially a manual valve associated with a pressure control valve so that the system can give:

1. A first hydraulic circuit line pressure range, defined by two calibrated restrictions or jets placed in series in a duct which is set at zero pressure by the manual valve in a first position; or 2. A second hydraulic circuit line pressure range, defined by said duct which is fed at the line pressure of the hydraulic circuit.

The variation of the line pressure is provided by a modulating solenoid valve, which establishes a modulated pressure acting on a differential section of said pressure control valve.

According to an embodiment of the invention, a first level of the second line pressure range is provided by the action of the line pressure on a small section of the pressure control valve, and by the cooperation of two adjustable jets, the first of which is closed when the second jet is open.

According to an embodiment of the invention, a second level of the second line pressure range is provided by the action of the line pressure on a large section of the pressure control valve, and by the cooperation of the two jets, of which the first jet is open and the second jet is closed.

According to an embodiment of the invention, the device includes a pressure control valve, which provides a so-called reference pressure of the hydraulic fluid of the circuit to feed the modulating solenoid valve.

According to an embodiment of the invention, the device includes jets that are associated in series to derive from the first reference pressure a second or intermediate reference pressure of the hydraulic fluid.

According to an embodiment of the invention, a second pressure control valve includes an additional control spool associated with a return spring which, from the first reference pressure, creates the intermediate reference pressure of the hydraulic fluid.

According to an embodiment of the invention, the feed of a secondary circuit goes through the first pressure control valve, and the pressure control valve has a land surface cutting off the feed of the secondary circuit in case of a sudden drop of the line pressure, caused by a large flow draw.

According to an embodiment of the invention, the hydraulic circuit is fed by a variable capacity pump, whose control duct goes through the first pressure control valve.

The first pressure control valve has a land surface that puts the control duct in communication either with a duct which is at line pressure, or with zero pressure, to assure control of the line pressure.

According to an embodiment of the invention, the first pressure control valve is provided with a chamber located between zero pressure and the chamber where the modulated pressure acts, said chamber receiving a bypass duct from the duct in which the intermediate reference pressure is established.

The invention thus offers the advantage of obtaining three distinct line pressure ranges in a simple manner, by control of the force of the spring of the first pressure control valve, and calibration, or selective closing or opening, of jets.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

The device according to the invention has a manual valve VM making possible feeding of hydraulic fluid to a main circuit and made up of a three-position spool 126, whose two end positions are referenced R and A. The main circuit is fully described in Applicants' copending U.S. patent application Ser. No. 777,444 entitled "Control System for a Four Speed Automatic Transmission" which was filed on the same date as the present application and which is incorporated by reference.

The hydraulic circuit is fed by a variable capacity positive displacement pump 20 pumping hydraulic fluid from a reservoir and through a strainer.

The circuit includes various elements necessary for the various pressure levels which must be controlled for operation of the system. These various elements include a first pressure control valve VRP, intended to provide the various line pressure levels necessary for the hydraulic circuit, and a second pressure control valve VLP 3.

Each of the elements of the hydraulic circuit has a body provided with various chambers (referenced by the chamber number followed by the reference of the element in question; for example, chamber 1 of the pressure control valve VRP will be referenced "chamber 1 VRP").

Figure 1:
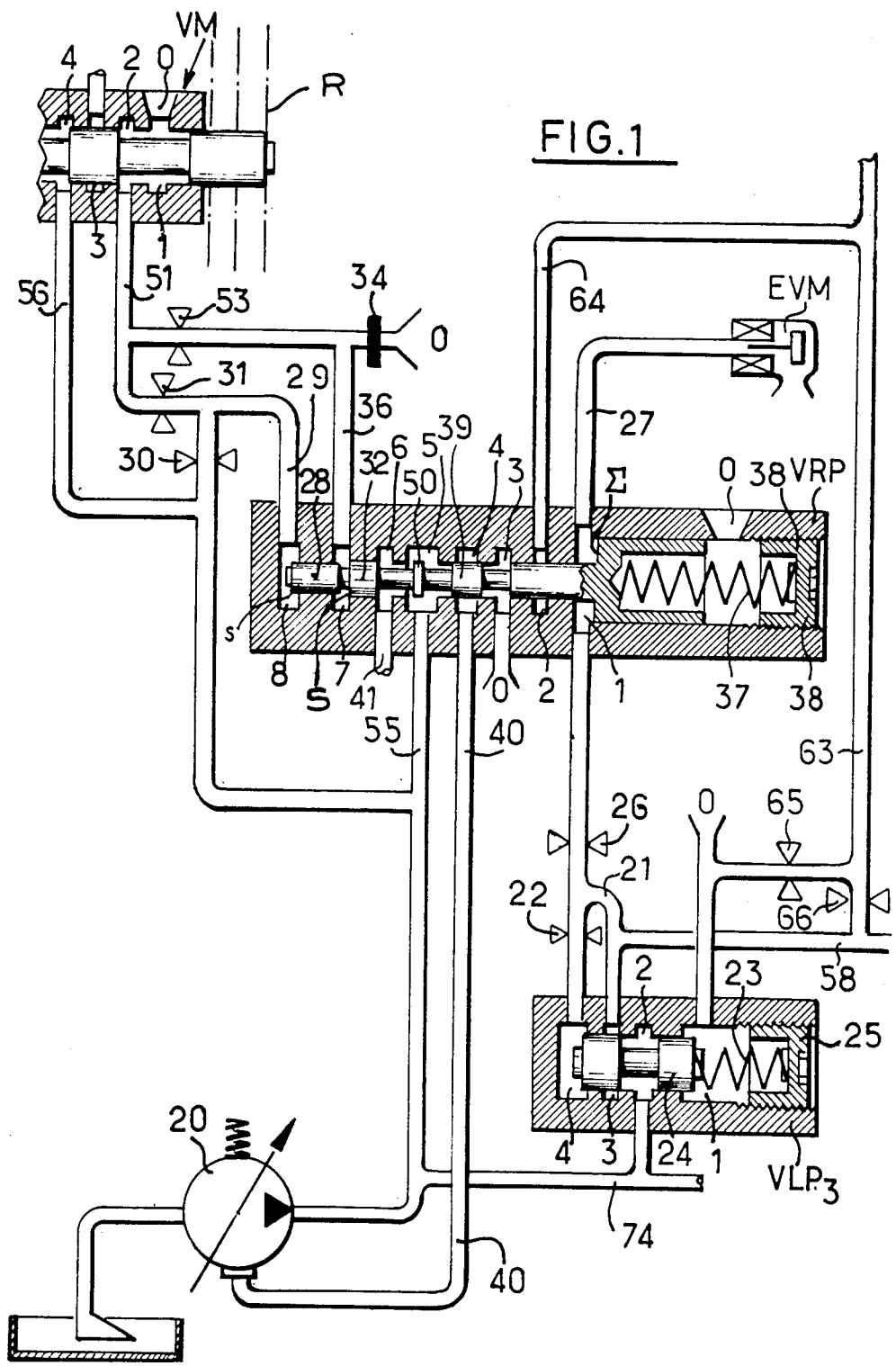
FIG. 1 illustrates the hydraulic circuit of the device according to the invention for a first pressure range.

There will first be described, with reference to FIG. 1, the hydraulic fluid pressure control system according to an embodiment of the invention. This system is compatible, due to the structure of pressure control valve VRP, with a vane pump 20 having a capacity that is variable by control of its eccentricity.

Pressure control valve VRP includes two spools 32 and 28 defining, together with the body of the valve, eight chambers respectively referenced, from right to left as 1, 2, 3, 4, 5, 6, 7 and 8. A spring 37 biases spools 32 and 28 to the left and rests on a threaded plug 38.

Pressure control valve VLP 3 includes a spool 24 which, together with the body of the control valve, defines four chambers respectively referenced, from right to left as 1, 2, 3 and 4. A spring 23 biases spool 24 to the left and rests on a threaded plug 25.

The output pressure of pump 20 is delivered via line 74 to chamber 2 VLP 3, whose spool 24 is of symmetrical design. A controlled reference pressure prevailing in duct 21 and in chamber 3 VLP 3 is introduced into chamber 4 VLP 3, through damping restriction or jet 22, thus balancing the force of spring 23 on the other end of spool 24 when pressure control valve VLP is in equilibrium. The reference pressure $P_1$ thus controlled, whose value is fixed by the force of spring 23, can be adjusted by screw plug 25 screwed into the body of valve VLP 3. Duct 21 is connected, through calibrated jet 26, to chamber 1 VRP of pressure control valve VRP where the pressure prevailing downstream from jet 26 acts on differential section $\Sigma$ of pressure control valve VRP. Duct 27 connects chamber 1 VRP to modulating solenoid valve EVM. This modulating solenoid valve EVM, of the normally open type, makes it possible to cause to prevail in duct 27, and therefore in chamber 1 of the differential section of valve VRP, a continuously variable pressure $P_M$ varying between reference pressure $P_1$ prevailing upstream from jet 26 (closed valve EVM) and a residual value close to 0 (zero) (open valve EVM).

Duct 29 is kept at an intermediate pressure equal to line pressure $P_L$ of pump 20 multiplied by the divider coefficient $\lambda$ of a hydraulic potentiometer made up of calibrated jets 30 and 31 in series, inserted in duct 55 where line pressure $P_L$ prevails and duct 51 set at 0 (zero) by manual valve VM when it is position R.

The pressure prevailing in duct 29 acts, within chamber 8 VRP of valve VRP, on spool 28 whose section s is less than section S of spool 32 of valve VRP. Moreover, chamber 7 VRP of valve VRP is set at 0 (zero) by duct 36, connected to duct 51 by jet 53 (jet 34 is closed), so that the balance equation of spools of valve VRP is written as:

$$s \cdot \lambda \cdot P_L + \Sigma \cdot P_M = F,$$

where F designates the return force of spring 37. There is thus obtained:

$$P_L = (F - \Sigma \cdot P_M)/(\lambda \cdot S) \quad (a)$$

Output pressure $P_L$, or line pressure, is controllable by adjustment of $\lambda$ and of F, and varies inversely to pressure $P_M$ and is established by control of the output of pump 20, as described below, so that, in case of electric failure of normally open valve EVM causing an approximately zero pressure $P_M$, pressure $P_L$ is then maximal, so that protection of the transmission is assured.

Figure 2:
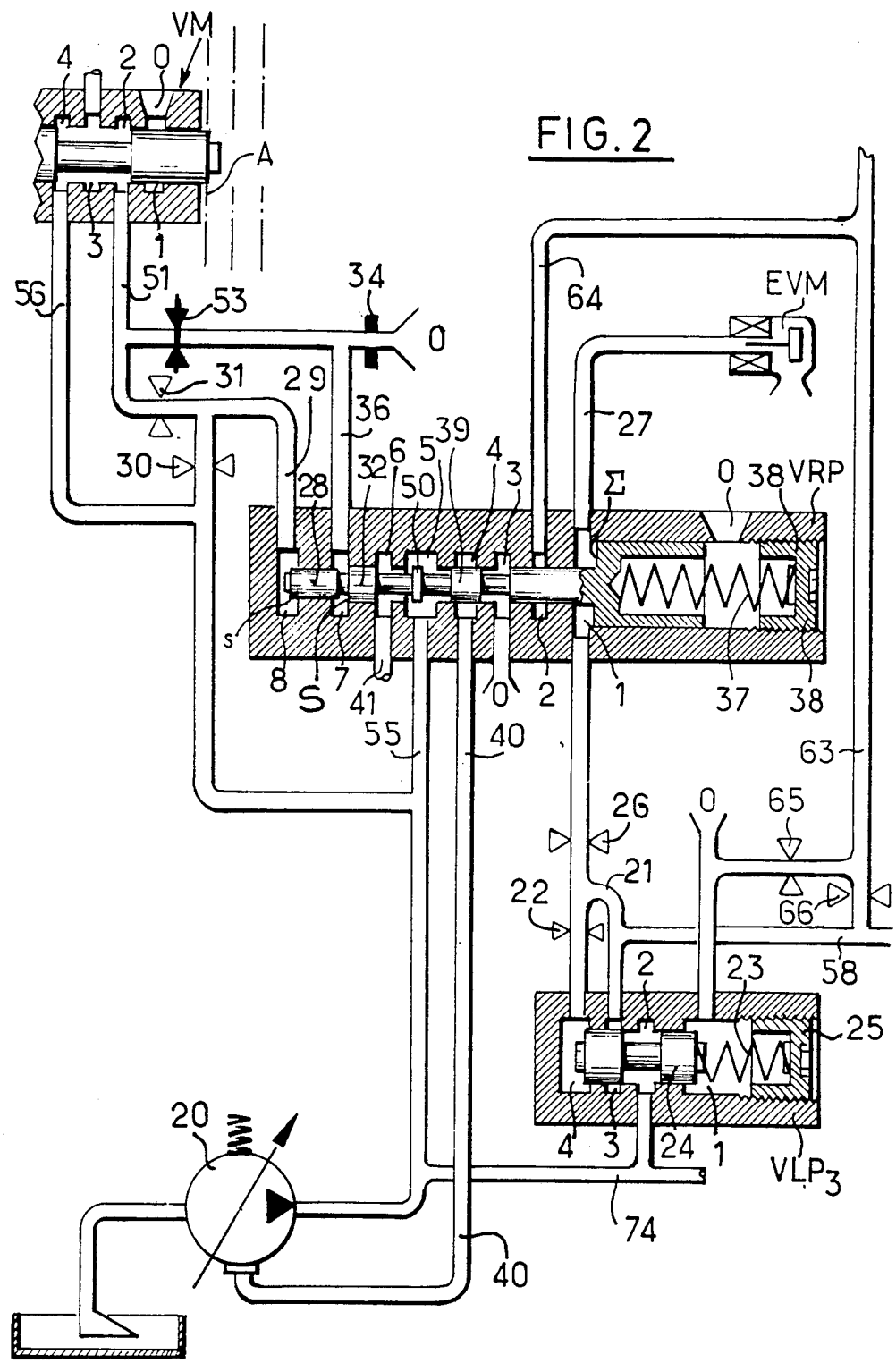
FIG. 2 illustrates the hydraulic circuit of the device according to the invention preset to provide a second pressure range with a first level.

Referring to FIG. 2, where jet 53 is closed and jet 34 is open, duct 36 is at 0 pressure and chambers 7 VRP is also at 0.

With reference to FIG. 2, it is seen that for position A of manual valve VM, the configuration of the unit of valve VRP is similar to that just described, except that pressure $P_L$, which is no longer affected by a divider coefficient $\lambda$, acts directly on spool 28. Actually pressure $P_L$ prevails in ducts 29 and 51, thus making inoperative the hydraulic potentiometer consisting of calibrated jets 30 and 31. Moreover, in this case jet 53 is closed and jet 34 is open with a large section at zero pressure. Chamber 7 VRP of valve VRP is thus always at 0 (zero), so that the equation of the equilibrium of valve VRP is written, with the same notations as above:

$$P_L = F/s - (\Sigma/s) \cdot P_M = (1/S) \cdot (F - \Sigma \cdot PM), \quad (b).$$

Pressure $P_L$ is controllable by adjustment of force F, and always varies, as a safety measure, inversely to pressure $P_M$. The value of $P_L$ at position A of valve VM is smaller than for position R by an amount dependent on the value of the reducing coefficient.

Figure 3:
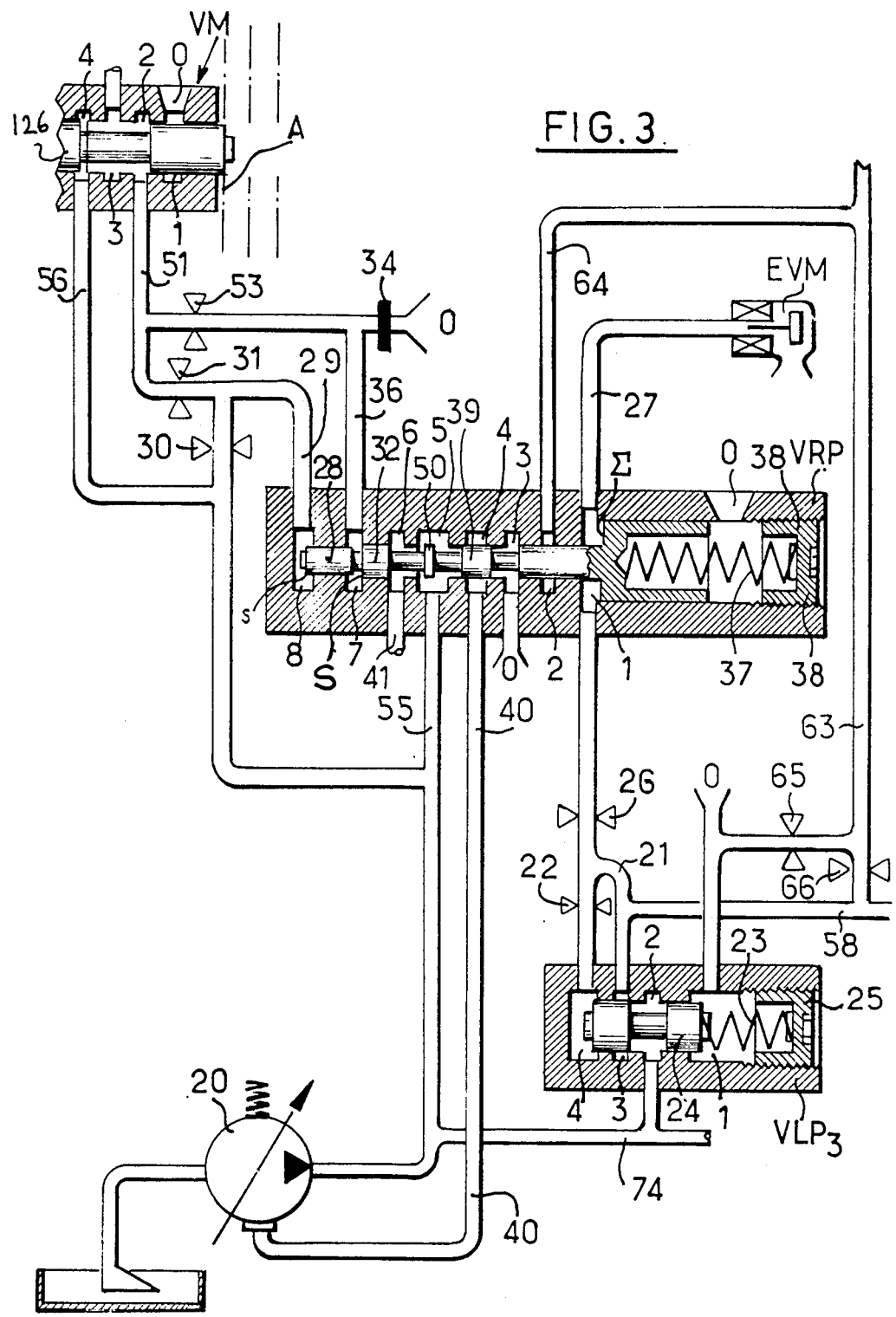
FIG. 3 illustrates the hydraulic circuit of the device according to the invention present to provide a second pressure range with a second level.

Referring now to FIG. 3, it can be seen that an alternative pressure level for the second pressure range can be achieved by the opening of jet 53 and closing of jet 34, so that spool 28 is subjected to line pressure $P_L$ at its two ends, which neutralizes its effect, while pressure $P_L$ acts on surface S in chamber 7 VRP of valve VRP. The equation of equilibrium of valve VRP therefore is written:

$$S \cdot P_L + \Sigma \cdot PM = F$$

$$P_L = F/S - (\Sigma/S) \cdot P_M = 1/s \cdot (F - \Sigma \cdot PM), \quad (c).$$

Pressure $P_L$ is controllable by adjustment of force F, and always varies, as a safety measure, inversely to pressure $P_M$. Also, the value of $P_L$ is smaller than when valve VM is in position A, in the ratio of s/S. This second value of $P_L$ corresponds to high capacity engines while the value of $P_L$ for the preceding position A corresponds to low capacity engines.

The set of three relations (a), (b) and (c) shows that the pressure control system of the system according to the invention makes it possible in a simple way, by control of the force of spring 37, and by calibration, selective closing and/or opening of the distribution jets, to obtain three distinct line pressure ranges, 2 for position A and 1 for position R, making it possible to satisfy all operating configurations of the automatic transmission.

Moreover, control of variable displacement pump 20 is achieved by land 39 of valve VRP. This land 39 is in its equilibrium position between chambers 3 VRP and 4 VRP of valve VRP. When pressure $P_L$ tends to exceed the set point defined by one of equations (a), (b) or (c) above, valve VRP has a tendency to move to the right under the action of spool 39, which communicates chamber 5 VRP of valve VRP where pressure $P_L$ prevails with chamber 4 VRP, and therefore increases the control pressure of pump 20 prevailing in duct 40. An increase in the pressure in duct 40 causes the capacity of pump 20 to decrease, which causes a drop of line pressure $P_L$.

On the contrary, when pressure $P_L$ tends to diminish, valve VRP has a tendency to move to the left under the action of spring 37, which favors putting chamber 4 VRP in communication with chamber 3 VRP, itself set at 0 (zero). There is consequently a drop in the pressure prevailing in duct 40, which makes the capacity of pump 20 increase, which causes a rise in line pressure $P_L$.

Further, a flow of hydraulic fluid at line pressure $P_L$ is transferred to duct 41, by going through chamber 5 VRP to chamber 6 VRP, which makes it possible to feed the unit of a secondary working circuit.

Moreover, when there is a sudden drop of line pressure $P_L$, due, for example, to a large flow draw caused by filling of a hydraulic receiver, valve VRP moves to the left under the action of spring 37, which enables bearing surface 50 of spool 32 of valve VRP momentarily to close the passage between chambers 5 VRP and 6 VRP. This action cuts off the flow going to duct 41 and from there to the secondary working circuit. Reduction of the flow caused by the momentary cutoff of the flow through the secondary working circuit enables line pressure $P_L$ to regain its set point more quickly and thus to perform the filling of a hydraulic receiver of the main hydraulic circuit under better conditions.

Manual valve VM has a spool 126, which delimits chambers referenced from right to left as 1, 2, 3 and 4.

Moreover, the hydraulic potentiometer, made up of calibrated jets 65 and 66 and connected in bypass between duct 58 where reference pressure $P_1$ prevails, and 0 (zero), creates in duct 63 an intermediate reference pressure $P_2$. This intermediate reference pressure $P_2$ has a value approximately equal to half of that of reference pressure $P_1$.

Moreover, pressure $P_2$ is brought, by a bypass duct 64 from duct 63, into chamber 2 VRP to balance the leaks going from chamber 1 VRP, where pressure $P_M$ prevails, to chamber 3 VRP, which is at 0, between situations where pressure $P_M$ is equal to $P_1$, and where $P_M$ is approximately zero.

It should be noted that the flow rate of the hydraulic potentiometer made up of jets 65 and 66 controls the operation of pressure control valve VLP 3 in a manner described in Applicants' copending U.S. patent application Ser. No. 777,325 entitled "Two-Level Pressure Control Device" filed on the same date as the present application and incorporated herein by reference.

Figure 4:
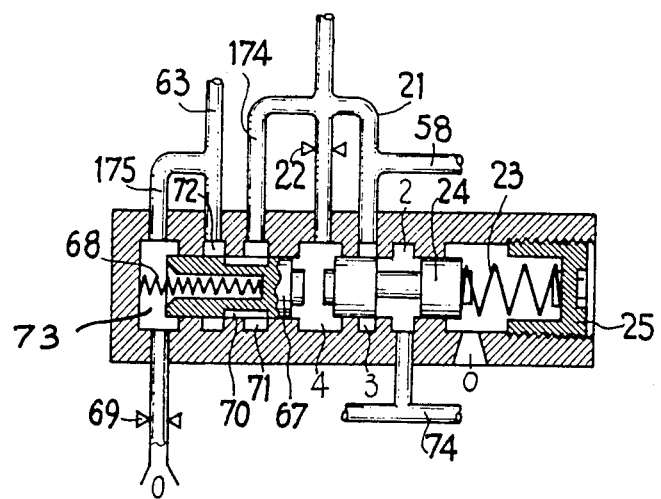
FIG. 4 illustrates another embodiment of the second pressure control valve.

An alternative arrangement for generating of pressure $P_2$ is shown in FIG. 4. The bore of valve VLP 3 of section 52 is extended so that it can receive an additional control spool 67 of section $S_2$. The body of this spool is hollow so that a return spring 68, calibrated at a force F', can be housed there. Pressure $P_1$, present in chamber 4 VLP 3 now common to valve VLP 3 and spool 67, acts on the right end of this spool 67. Moreover, pressure $P_1$ is brought by a duct 174 which enters duct 21, into chamber 71 of spool 67. The diameter of the body of spool 67 is reduced at chamber 71 to form a cylindrical narrowing 70, thus creating, at right angles to chamber 72, a control lip making it possible to generate pressure $P_2$ in chamber 72 and consequently in duct 63 already defined. Actually pressure $P_2$ is introduced by duct 175 into chamber 73, so that the equilibrium equation of slide 67 is written:

$$P_2 \cdot S_2 + F' = P_1 \cdot S_2, \text{ or } P_2 = P_1 - F'/S_2, \tag{d}$$

Finally, chamber 73 is connected to 0 (zero pressure) by a small-diameter jet 69. This makes it possible to create a constant control flow favorable to a good operation of spools 24 and 67.

The control unit constituted by spool 67 and its associated chambers takes the place of the pressure divider defined by calibrated jets 65 and 66, and is connected to the rest of the hydraulic circuit by ducts 21, 58, 63 and 74, already mentioned.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pressure control system comprising:
   variable capacity means for providing a hydraulic line pressure; and
   means for adjusting said line pressure, comprising:
   (a) a pressure control valve,
   (b) a first spool movable in said pressure control valve,
   (c) spring means in said pressure control valve for biasing said first spool in a first direction,
   (d) means for supplying a controlled hydraulic reference pressure to a differential section of said first spool for moving said first spool in a direction opposite said first direction,
   (e) means for modulating said reference pressure,
   (f) a second spool in said pressure control valve, said second spool being movable in said direction opposite said first direction into contact with said first spool,
   (g) means for varying said variable capacity means in response to movement of said first spool,
   (h) means for supplying hydraulic pressure to said second spool for moving said second spool in said direction opposite said first direction, comprising:
      (i) a first hydraulic line connected to said pressure control valve for supplying hydraulic pressure to said second spool,
      (ii) a manual valve movable into two positions for selectively connecting said first line to one of said line pressure and zero pressure,
      (iii) a second hydraulic line connected between said first hydraulic line and a source of said line pressure,
      (iv) a first restriction in said first line at a position between said manual valve and a point of connection with said second line, and
      (v) a second restriction in said second line, whereby when said manual valve is in a position for connecting said first line to zero pressure, said first and second restrictions define a hydraulic potentiometer reducing said line pressure.

2. The system of claim 1 wherein said means for modulating said reference pressure comprise:
   a hydraulic line connecting said differential section of said first spool with zero pressure; and
   a modulating solenoid valve for adjusting a sectional area of said hydraulic line connecting said differential section with zero pressure.

3. The system of claim 1 including means for selectively subjecting said first spool to said line pressure for moving said first spool in said direction opposite said first direction, and for selectively subjecting said second spool to said line pressure for moving said second spool in said first direction.

4. The system of claim 3 wherein said means for selectively subjecting comprises:
   a third line connected to said pressure control valve at a position such that hydraulic pressure therein acts on said first spool in said direction opposite said first direction and acts on said second spool in said first direction; and variable restriction means for selectively communicating said third line with one of said first line pressure and a region of zero pressure.

5. The system of claim 1 including means for supplying said controlled reference pressure.

6. The system of claim 5 wherein said means for supplying said controlled reference pressure comprises:
a second pressure control valve having at least a third spool slidable therein;
second spring means biasing said spool in a second direction;
means for supplying hydraulic pressure to said third spool in a direction in opposition to said second direction, whereby movement of said third spool will maintain said hydraulic pressure at said controlled reference pressure; and
means for providing a second controlled reference pressure different from said controlled reference pressure and varying as a function of said controlled reference pressure.

7. The device of claim 6 wherein said means for providing a second controlled reference pressure comprise:
a first output conduit at said first controlled reference pressure;
a second output conduit connected to said first output conduit and having a first calibrated jet therein;
a bypass conduit connected between said second output conduit at a point downstream from said first calibrated jet and a region of zero pressure; and
a second calibrated jet in said bypass conduit.

8. The device of claim 6 wherein said means for providing a second controlled reference pressure comprises:
a fourth spool in said second pressure control valve;
means for supplying said first controlled reference pressure to said fourth spool for moving said fourth spool in a third direction;
third spring means for biasing said fourth spring in a direction opposite said fourth direction; and
means for supplying hydraulic pressure to said fourth spool for moving said fourth spool in said direction opposite said fourth direction, whereby movement of said fourth spool will maintain said hydraulic pressure supplied in said direction opposite said fourth direction at said second controlled reference pressure.

9. The device of claim 7 wherein said third spool is of a symmetric design.

10. The device of claim 8 wherein said third spool is of a symmetric design.

* * * * *